United States Patent [19]

Buckley

[11] 4,258,701

[45] Mar. 31, 1981

[54] SOLAR COLLECTOR PANEL

[75] Inventor: Bruce S. Buckley, Cambridge, Mass.

[73] Assignee: Chevron Research Company, San Francisco, Calif.

[21] Appl. No.: 783,764

[22] Filed: Apr. 1, 1977

[51] Int. Cl.³ .............................................. F24J 3/02
[52] U.S. Cl. ................................... 126/434; 126/446; 126/450; 126/431; 165/48 S
[58] Field of Search ............... 126/270, 271, 400, 428, 126/429, 430, 431, 436, 434, 444, 445, 446, 449, 450; 165/164, 166, 167, 161, 48 S

[56] References Cited

U.S. PATENT DOCUMENTS

| 1,853,480 | 4/1932 | Wheeler et al. | 126/271 |
|---|---|---|---|
| 2,213,894 | 9/1940 | Barry | 126/271 |
| 2,388,940 | 11/1945 | Taylor | 126/271 |
| 2,705,948 | 4/1955 | Rostock | 126/271 |
| 3,463,161 | 8/1969 | Andrassy | 126/400 X |
| 3,720,198 | 3/1973 | Laing et al. | 126/400 |
| 3,785,365 | 1/1974 | Laing et al. | 126/408 |
| 3,980,071 | 9/1976 | Barber, Jr. | 126/271 |
| 4,003,367 | 1/1977 | Wikholm | 126/271 |
| 4,033,325 | 7/1977 | Walker | 126/271 |
| 4,050,508 | 9/1977 | Buckley | 165/32 |
| 4,073,284 | 2/1978 | Laing | 126/400 |
| 4,083,490 | 4/1978 | Cunningham | 126/271 |
| 4,095,585 | 6/1978 | Oquidam | 126/400 |
| 4,124,018 | 11/1978 | Murray et al. | 126/271 |

OTHER PUBLICATIONS

"Thermic Controls to Regulate Solar Heat Flux into Buildings" Buckley, NSF Report NSF/Rann/Se/GI--43897/Pr/75/2 Aug. 25, 1975.

Primary Examiner—James C. Yeung
Assistant Examiner—Larry Jones
Attorney, Agent, or Firm—Edward J. Keeling; R. H. Evans

[57] ABSTRACT

A heat transmission module wherein a natural-circulation, solar collector, storage tank, insulation and other interrelated parts are fabricated as a unitary structure capable of bearing a load.

14 Claims, 15 Drawing Figures

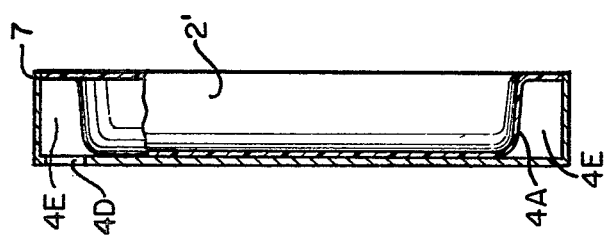
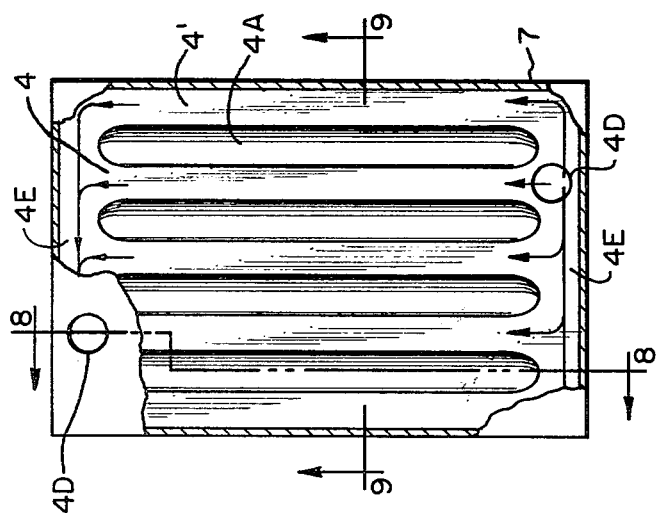
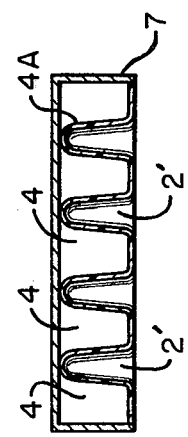
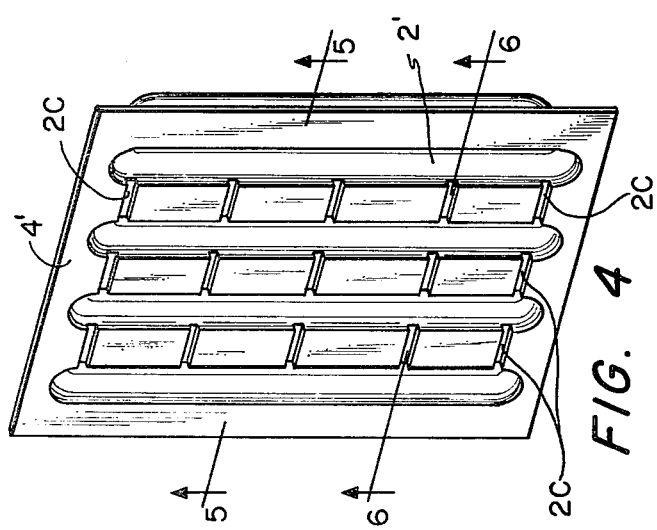
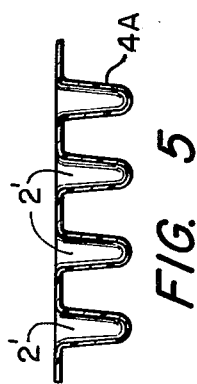
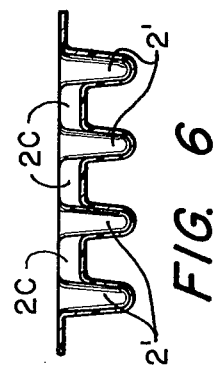

SOLAR COLLECTOR PANEL

GOVERNMENT RIGHTS

The Government of the United States of America has rights in this invention under an agreement that is based on National Science Foundation Grant No. GI-43897 to the Massachusetts Institute of Technology.

The present invention relates to solar collectors and the like.

Attention is called to an application for Letter Patent, Ser. No. 588,093, filed June 18, 1975, now U.S. Pat. No. 4,137,964, by the present inventor.

Solar energy collection systems usually have many components which are distributed throughout a residence: a collector on the roof, storage in the basement, and so forth. However, these elements can be combined together to form an integral module which has insulating and structural properties as well. Combining these components together reduces both the material cost of the system (since one wall of storage can double as a wall of the insulation) and reduces installation cost through the use of an easily installed module.

Accordingly, an object of the present invention is to provide a novel, unitary, naturally-circulating, liquid-filled, solar panel.

Another object is to provide such a solar panel with load-bearing capability.

A further object is to provide variations in the configuration of elements of such panels, as well as various combinations of such panels formed into larger arrays.

Further objects are addressed hereinafter.

The foregoing objects are achieved in a heat transmission module having, in combination, solar collector means containing a liquid medium, storage means connected to exchange liquid with the solar collector means, there being liquid flow between the solar collector means and the storage means forming a natural convection circulation loop, and an insulator separating the solar collector means from the storage means, at least two of the collector means, the storage means and the insulator being bonded together to form a unitary load-bearing structure wherein the load is distributed over at least two of the elements that form the module.

The invention is hereinafter described with reference to the accompanying drawing in which:

FIG. 4 is an isometric view of another element of FIG. 1, that is, a storage shell;

FIG. 5 is a section view taken on the line 5—5 in FIG. 4, looking in the direction of the arrows;

FIG. 6 is a section view taken upon the line 6—6 in FIG. 4, looking in the direction of the arrows;

FIG. 7 is an elevation view, partly cutaway, of another element of FIG. 1, that is a cover shell and part of storage layer or shell;

FIG. 8 is a section view taken upon the line 8—8 in FIG. 7, looking in the direction of the arrows;

FIG. 9 is a section view taken upon the line 9—9 in FIG. 7, looking in the direction of the arrows;

Figure 1:
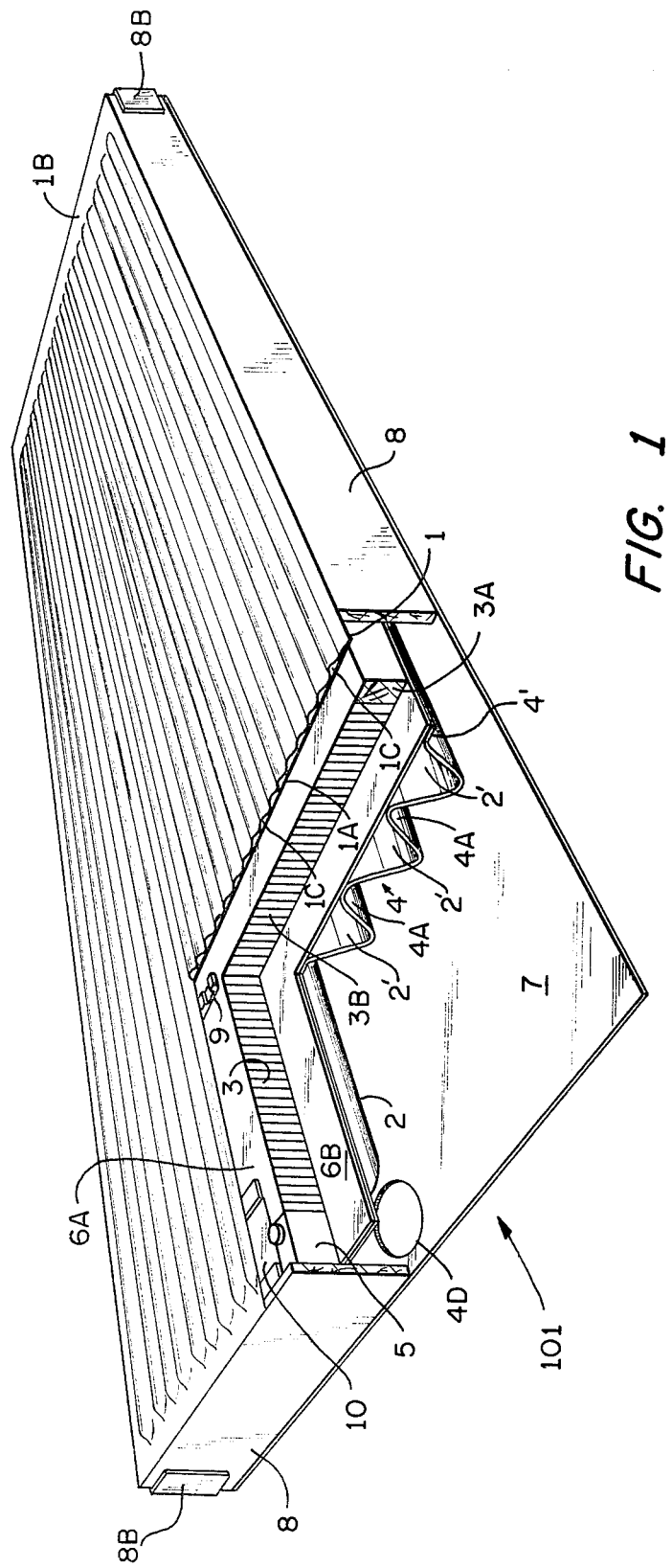
FIG. 1 is an isometric view, partly cutaway, showing a heat transmission module of the present invention.

Turning now to FIG. 1 there is shown at 101 a heat transmission module or panel that includes a solar collector 1 consisting of an expansion membrane 1A and a sensor skin 1B that form a plurality of channels 1C to contain a liquid and allow the liquid to be heated by the sun's rays. Storage means 2, comprising a plurality of elongated cells, is connected to exchange liquid with the solar collector 1, there being liquid flow between the solar collector 1 and the storage cells 2' via natural convection circulation. An insulator 3 separates the solar collector 1 from the storage means 2. As later discussed herein, the solar collector 1, the storage means 2 and the insulator 3 are structurally bonded together to form a unitary load bearing structure wherein the load is distributed over a number of the elements (i.e., the insulator and the storage cells and in some cases also the solar collector). The outer surfaces 4A of the storage cells 2' serves as heat exchange surfaces forming elongated ducts 4 through which air may flow past the storage cells 2' to effect efficient heat transfer therebetween. The module 101 further includes valve means 5 (see for example the various valving mechanisms in said application Ser. No. 588,093) in the liquid flow path to modulate liquid flow between the solar collector (that is, between the channels 1C) and the cells 2' of the storage means 2. The insulator 3 is a honeycomb structure bounded by face sheets 6A and 6B in FIG. 2. The module 101 further includes a cover 7, a perimeter frame 8, and skin supports 9. Headers 10 connect the channels 1C to the storage cells 2'. There now follows a detailed discussion the various elements of the module 101, the interaction between elements and the combination of multiple modules 101.

Figure 2:
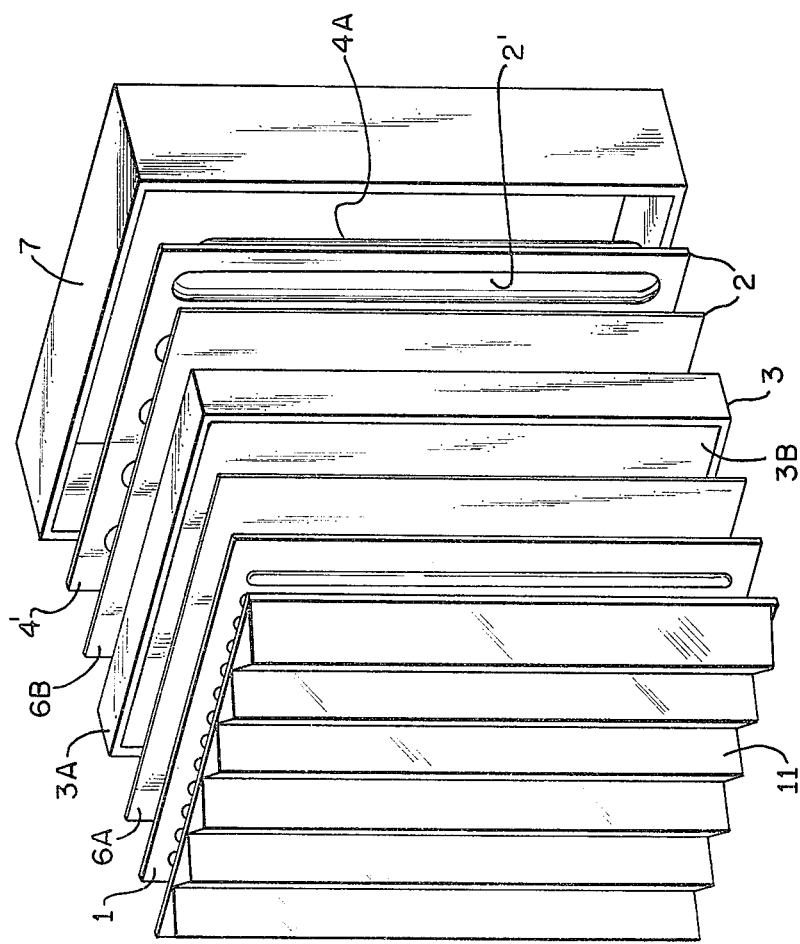
FIG. 2 is an isometric exploded view showing a heat transmission module, similar but not identical to the module in FIG. 1.

The solar panel 101, as shown in FIG. 2 (the panel in FIG. 2 is similar but not identical to the panel in FIG. 1, e.g., the cover 7 in FIG. 1 is a flat sheet, whereas it is shown as a cover shell 7 in FIG. 2 and the frame 8 of FIG. 1 is not included in the panel of FIG. 2), is made up of different layers, beginning with a glazing layer 11 (not shown in FIG. 1) which lets the solar energy through while reducing heat losses from the collector 1, the second layer. The collector 1 itself can be made of two metal (or plastic) layers 1B and 1A bonded together; fluid flow passages 1C are formed into one or both layers or between the layers as shown in FIG. 1. Fluid connections between this collector layer 1 and other components are discussed above and later. The glazing layer 11 is not always necessary. For instance when panels 101 are used for heat dissipation in the summer, the glazing 11 should be removed. Thus the glazing 11 might not be permanently bonded to the collector 1 but only mechanically attached. In some locations (e.g. the American Southwest) glazing 11 may not be needed at all. The glazing can be a one-piece fiberglass or plastic mold which is corrugated for structural rigidity in the usual manner. If the corrugations are vertically oriented as shown, air passages formed between the glazing and collector can be vented and thereby used for cooling the collector surface.

Figure 3:
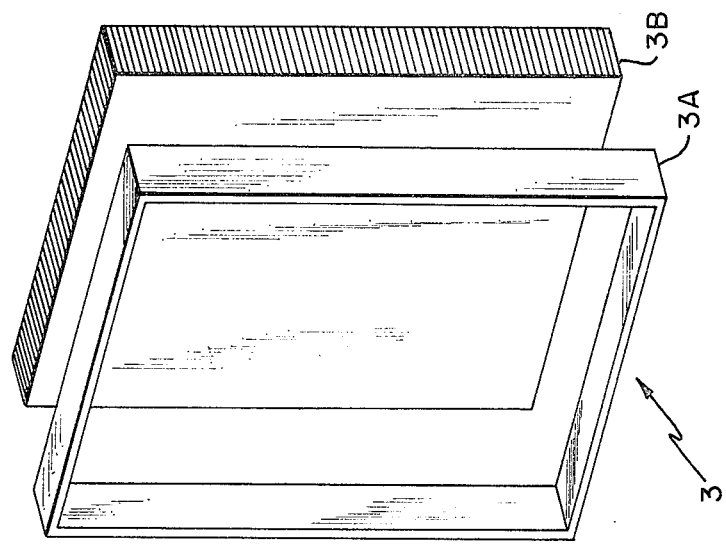
FIG. 3 is an isometric exploded view of one element of FIG. 1, that is, an insulating layer.

The third layer (FIG. 3) is the insulation 3 of the module. It consists of a non-conducting frame 3A on the perimeter of the layer and an insulating layer 3B filling the rest of the layer. This layer could be simply an insulating layer in some designs, but the insulating layer can also be made to carry structural loads. If the insulating layer 3B is covered on each side by a thin face sheet 6A or 6B (e.g. metal or fiberglass) and the insulation 3B is bonded to the face sheets to prevent localized buckling, a composite sandwich is formed which is capable of carrying live and dead loads applied to the panel. The loads are carried by the face sheets 6A or 6B into the perimeter frame 8 in FIG. 1 from which they can be carried to the modules mounting system labeled 8B. Paper honeycomb or rigid glass foam or plastic foam are examples of materials which could be used to prevent the face sheets from buckling and also to provide insulation. In the case of paper honeycomb, foamed plastic or other insulator can be used to fill the honeycomb and increase the module's insulating qualities. The non-conducting frame 8 of the module can be wood, fiberglass or in some designs even a conducting frame material such as aluminum but with non-conducting thermal barriers to prevent heat from conducting through the module.

Considerable economy can be gained by having the outer face sheet 6A also used as part of the collector in FIG. 2. Also, fluid flow passages can be integrally formed into the perimeter frame 3A when the design permits so that fluid may be extracted from the collector and directed to storage 2.

The next layer inside the insulating layer 3 is the storage means 2. As shown in FIGS. 2 and 4, it is a one-piece formed sheet 4' of a material such as fiberglass or metal which is bonded to the inner face sheet 6B to form a shell: hence the inner-face sheet 6B can also double as a storage container wall for the storage shell 2 and a load-carrying sheet as well. The storage layer or shell 2 is formed such that the contained fluid is held in a multiple cell configuration comprising the cells 2'. Each cell 2' has a low perimeter to cross-section area (usually with curved walls) so that the internal pressure due to static head or pressurization will result in low stresses in the storage shell 2. The cells 2' are often interconnected via various cross-ports 2C in FIG. 4 allowing fluid to flow easily from one cell to another if required by the design.

This storage shell 4A can be combined into an integral heat exchanger by providing air passages 4 between the storage cells, as above discussed. The air-passages adjacent to the cells allow heat to be easily extracted through the storage shell and to be transferred away by convection or radiation heat transfer. Since the shell's surface area is usually greater than that of the collector, a large surface is available for efficient heat transfer to the building's interior. In some cases the storage shell itself would be exposed to the building interior, heating the interior by radiation and free or forced convection from the hot storage liquid contained in the storage shell. In other installations of this module, the storage shell 2 would be exposed to an air plenum, for example an attic, which would be heated by natural convection from the surface of the storage cells. It should be noted that if the storage shell material is made of a thermal non-conductor like fiberglass it should be fairly thin (about $\frac{1}{8}''$ or less) so that heat can flow easily from the contained liquid to the air adjacent the storage shell.

The last (innermost) layer is the cover-shell 7 in FIG. 2. It is simply an open box of metal, fiberglass or other appropriate material. In the event that heat is to be extracted from the storage liquid by forced-air convection, the cover shell 7 in combination with the storage shell 2 form integral air-ducting channels 4 of a forced-air heat exchanger. The storage cells 2', for this design, are made shorter than the inside dimensions of the cover shell 7 forming air headers 4E at each end of the module 101; see FIGS. 7 and 8. Thus air forced (or in some cases naturally convected) into an inlet 4D at the bottom of the module cover shell is distributed via the header 4E to air passages 4 between each storage cell 2'. The air streams are recombined at the other end of the passages in the air header 4E there and ducted to the upper outlet 4D for heating the building. The sides 4A of the storage cells 2' double as heat-exchangers of heat flow from the storage liquid to the airstream and as internal air ducting 4 for the free or forced air flowing through the module.

The air flow through the module need not be fed individually to each module as shown by the air inlet and outlet of FIG. 7, but in some designs, several modules 101 may be ganged together so that air can pass from one to the next. By allowing the inlet/outlet 4D to be in the edges of the cover shell with appropriate sealing (see the inlets/outlets again labeled 4D in FIGS. 10, 11, 12 and 13), the air flowing through one module would flow directly into another. This makes the cover shell double as internal flow passages 4 as well as intermodule ducting 4D. Interconnections between modules would be useful in installing an array of modules on the exterior of a roof or wall where interconnections out of the plane of the modules could prove awkward.

Figure 10:
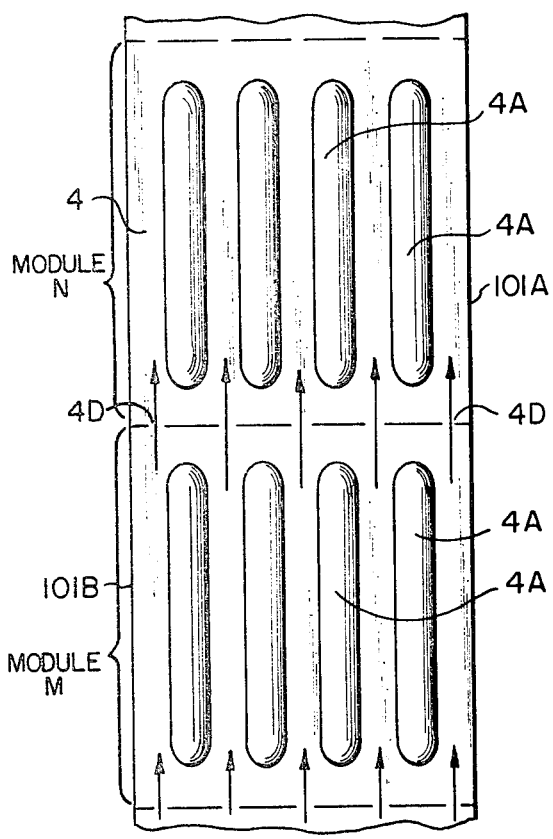
FIG. 10 is a schematic representation showing a part of two vertically oriented modules like the module of FIG. 1.
Figure 11:
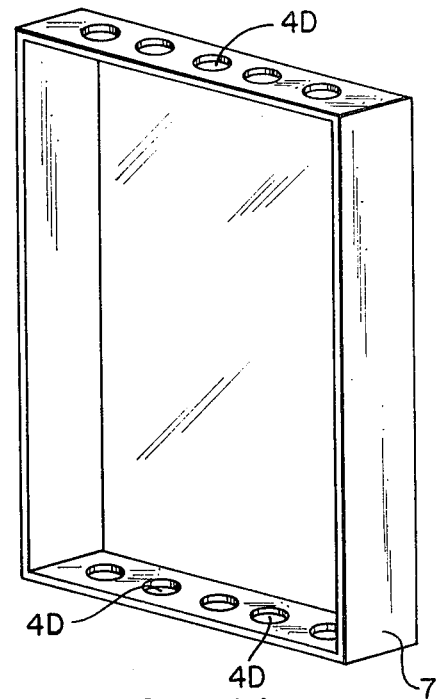
FIG. 11 is an isometric view of a cover shell for each of the modules of FIG. 10.
Figure 13:
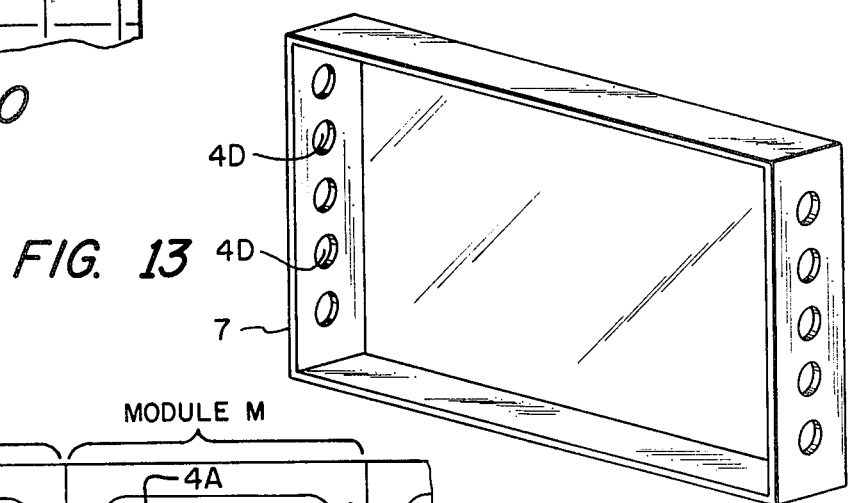
FIG. 13 is an isometric view of a cover shell for each of the modules of FIG. 12.
Figure 12:
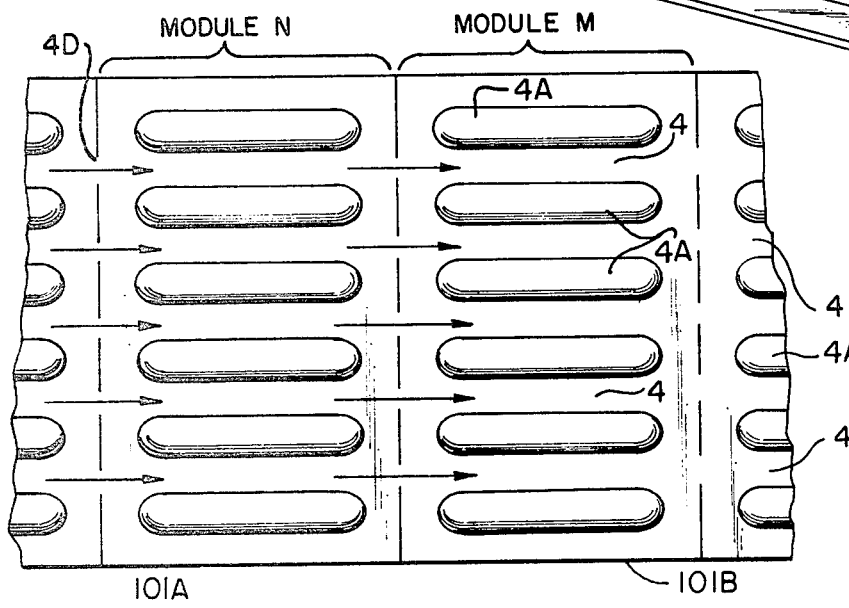
FIG. 12 shows schematically an array like that of FIG. 10, but horizontally oriented.

Many possible configurations of module interconnections exist; choice of configuration will depend on size of the array, type of heating system, type of mounting system and several other considerations. FIGS. 10 and 12, respectively show ganging of the modules in vertical and horizontal arrays; in these two figures there are shown the backs of the heat storage cells 2', that is, the heat exchange surfaces 4A that form the air ducts 4, and the modules are marked 101A (module N) and 101B (module M). In the vertical array, FIG. 10, the design is essentially as described earlier: either free or forced convection can be used to extract heat from the storage liquid in the cells 2'. However in the horizontal array of FIG. 12 forced air convection would probably be necessary to efficiently exchange heat between the storage liquid and airstream. This is because free convection only works well with a large vertical component to the airstream.

In designing the internal air flow passages 4 for the modules, the headers 4E interconnecting ducts 4D and other air passages should be sized to allow an even flow distribution throughout the array without excessive pressure drops. In parallel air-flow paths, the various paths must have nearly equal fluid resistance (both due to orifice effects and viscous losses) or the flow will not divide equally among the paths. Uneven flow distribution can give inefficient heat transfer characteristics to the module or the array.

The horizontal storage cells shown in the horizontal array in FIG. 12 require further note. Not shown are cross-ports similar to 2C of FIG. 6 between the horizontal storage cells 2' which allow the transfer liquid (usually water) to flow from one cell to the next. In horizontal arrays, the transfer liquid would flow vertically (probably top to bottom) to encourage stratification: the tendency for hotter liquid to rise to the top of the storage. Stratification improves efficiency of solar collection because cooler liquid enters the collector inlet, thereby reducing the temperature of the collecting surface and lessening heat losses. Of course, stratification occurs in vertically-oriented storage cells as well but the effect is reduced by conduction of heat through the storage liquid. But in the horizontal cells conduction is minimized because only the cross-ports are heat-conduction paths.

The module 101 described above has been assumed to be a heating panel, one which absorbs solar energy via the integral collector and stores it in the integral storage containers as heated liquid. However, this same module can be used to cool a building: the collectors are used as heat dissipators which lose heat to the environment by night, storing cooled liquid for use as a heat sink by day. Only the direction and timing of internal liquid flow differs between the heating application and cooling application. Thus with relatively minor changes to this control function of the valve 5 in FIG. 1 the modules can be used for heating (e.g., in winter) and cooling (e.g., in summer).

INTERNAL LIQUID FLOW

In the module described so far, no mention has been made of the method by which liquid flows between the collector layer 1 and the storage layer 2, that is, between the channels 1C in FIG. 1 and the cells 2'. The channels 1C and the cells 2' are liquid-filled (e.g., water) with passive means by which the liquid is allowed to flow therebetween. Passive means use only the heat energy associated with the outside environment, solar radiation, or the building's heat. Passive means relies on buoyancy-induced pressure forces (thermosyphon effect) to cause flow from collector means 1 to storage means 2 by natural convection.

It should be noted that for easiest installation and repair, the modules should be as independent as possible: few interconnections should be made between modules. Thus the collector layer should connect to the storage layer at two points to form a closed liquid circulation loop in each module. If one connection is placed on the top of the module (as installed) and the other at the bottom, buoyancy induced pressure forces will passively pump the enclosed liquid between the two layers. Blocking this natural convection flow by some means 5 in FIG. 1 will produce a heating or a cooling module.

For example, the valve means 5 could be electric solenoid valves used to block the convection flow between the two layers of a module; the solenoid can be operated by a self-contained photo-voltaic cell or can be operated by a separate power supply operating a single module or an entire array of modules. Similarly, pneumatically operated valves can block the convection loop of one or more modules. In any event, the control of the valve 5 can be effected by a combination of one or more variables such as time of day, solar intensity, ambient temperature, collector temperature or storage temperature, for example. The important aspect is that the natural convection circulation between collector and storage layer is modulated or valved by some external means.

The valving can also be due to internal means. For example, the invention of an application for Letters Patent Ser. No. 626,402 filed Oct. 28, 1975, describes a module with a pressure activated check valve which modulates the flow between layers due to a simple diode function: a temperature difference between layers causes heat to flow primarily in one direction only. Other internal means are described in said Ser. No. 588,093 and rely on other temperature parameters of the system.

The valving mechanism described above—selectively blocking the natural convection loop—can be eliminated by using the thermosyphon effect of domestic hot-water heaters in use throughout the world. Rather than physically valving the flow between layers, the inherent properties of the fluid can be used to cause heat to flow in one direction between the layers. Although this unvalved thermosyphon effect is not new or innovative, its use has never been applied to the module described here.

Figure 14:
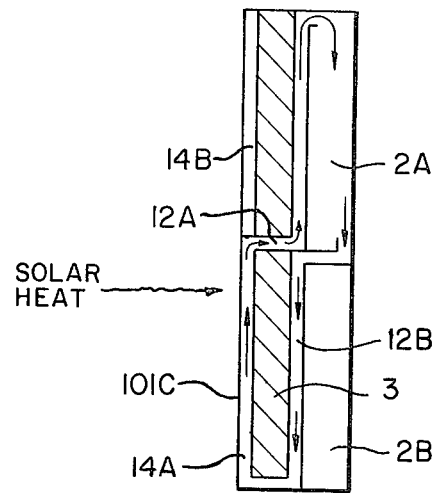
FIG. 14 is a schematic section view of a modification of the module of FIG. 1.

The unvalved thermosyphon relies on the solar collector being located at a lower level than the liquid storage medium. FIG. 14 shows schematically how heating could be accomplished using the integral module described here, which module is labeled 101C in FIG. 14. In each module 101C a portion of the collector layer marked 14A is separated from the rest of the collector layer marked 14B which is connected to an isolated section of a storage layer 2A located above it. A duct 12A connects the top of collector section 14A to the top of the storage section 2A; another duct 12B connects the bottom of the collector section 14A to the bottom of the storage section 2A. When solar energy heats the collector section 14A heated liquid flows to the storage section 2A by natural convection. But when the collector section cools (e.g. at night), the buoyant heated liquid in the storage section doesn't form the reverse convective flow. Hence, the inherent properties of the liquid itself can perform the valving function. It should be noted that the collector section need not be entirely below the storage section for sufficient natural convection flow to take place; however most of the collector section must be below most of the storage section.

Unfortunately, this unvalved thermosyphon effect applied to the integral module 101 of the present invention is very inefficient from a cost viewpoint: as shown, only half of the module is an active solar heat collector. Since solar system cost is approximately proportional to module surface area, all of the module's exposed surface should be active solar collecting area. One way to increase the active solar collecting area is to repeat the structure shown in FIG. 14 several times in each module. Thus each module 101C need not have only two collector sections and two storage sections but could have more of each connected in similar manner.

Figure 15:
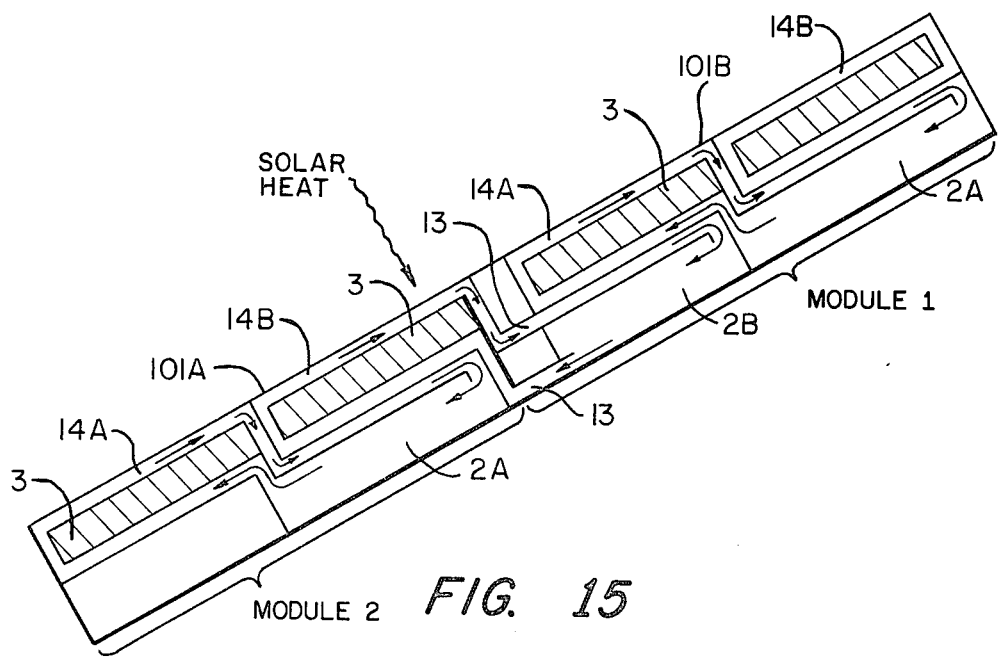
FIG. 15 is a schematic section view further showing two of the modules of FIG. 14 connected together.

Another way to minimize the lost active collector area in a module such as FIG. 14 is to gang the modules 101C in arrays such that the collector 14B of a lower module uses the storage 2B of an upper module always keeping the collector below storage, though. FIG. 15 shows this concept applied to modules 101A (also marked module 2) and 101B (also marked module 1) similar to those of FIG. 14. As more similar modules 101C are arrayed vertically (or at an angle as shown), the proportion of active collectors 14A and 14B to total exposed area increases. The disadvantages of this method is that interconnections 13 are needed between modules and that the active collector area will always be less than the exposed surface area of the modules. Also the modules can only be used for heating or for cooling (but not both) without the number of interconnections becoming unwieldy.

In summary, the integral module 101 described above reduces the cost of a solar energy system by minimizing the materials cost of the panel. Materials cost is approximately related to the weight and thus the volume of the material used. The module 101 described here minimizes the volume of material by allowing each material layer to be thin (except for the insulation) and to serve double-duty (i.e., two or more purposes); thus for example, the insulating structure 3, the storage means 2 (the walls 4A of which perform a heat exchange function, as above explained) and/or the solar collector 1 are bonded together by use of adhesives or other fastening and sealing mechanisms to provide secondary distributed load bearing functions as well as the primary functions of each. Also, since installation cost of a solar system is a major item, by combining all the functions—collector, storage, heat-exchanger and ducting—into a single module, the expense of separate installation is eliminated.

Lastly, these modules may prove to be more efficient than separate function systems for two reasons. First, stratification of temperature in storage can be quite pronounced in some designs based on thermosyphon flow; well-stratified storage gives improved efficiency. Secondly, storage spread over a wall surface acts as a thermal barrier to heat which would normally be lost by conduction through the surface; the interior loses heat to a solar-warmed storage layer rather than directly to the exterior.

Further modifications of the invention herein described will occur to persons skilled in the art and all such modifications are deemed to be within the scope of the invention as defined by the appended claims.

What is claimed is:

1. A heat transmission module that comprises, in combination: solar collector means containing liquid for absorbing solar radiation; storage means for storing liquid, the storage means connected to the solar collector means through liquid flow passages to exchange liquid therebetween, the liquid flow between the solar collector means and the storage means forming a natural convection circulation loop; and insulation means for insulating and separating the collector means from the storage means and for carrying structural loads; the storage means and the insulation means being structurally bonded to each other in load-bearing relationship, at the periphery of the module and at a multiplicity of zones distributed throughout the area of the module within the periphery, so as to provide a unitary load-bearing structure.

2. A heat transmission module as claimed in claim 1 which includes a heat exchanger combined as part of the storage means.

3. A heat transmission module as claimed in claim 2 that includes valve means to modulate liquid flow between the solar collector and the storage means.

4. A heat transmission module as claimed in claim 1 that further includes duct means to permit air flow past the storage means to effect efficient heat transfer.

5. A heat transmission module as claimed in claim 4 that includes valve means to modulate liquid flow between the solar collector and the storage means.

6. A heat transmission module as claimed in claim 1 wherein the collector means also serves a dissipator function.

7. A heat transmission module as claimed in claim 1 that includes valve means to modulate liquid flow between the solar collector and the storage means.

8. A system comprising a plurality of modules, like the module of claim 1, connected in ganged configuration.

9. A heat transmission module as claimed in claim 1 whose storage means also performs a heat exchanger function.

10. A heat transmission module as claimed in claim 1 whose storage means also performs a duct function permitting effective air flow past the storage means to effect efficient heat transfer therebetween.

11. A heat transmission module that comprises, in combination: solar collector means containing a liquid for absorbing solar radiation; storage means for storing liquid, the storage means connected to the solar collector means through fluid flow passages to exchange liquid therebetween, the liquid flow between the solar collector means and the storage means forming a natural convection circulation loop; and insulation means for insulating and separating the collector means from the storage means and for carrying structural loads; the storage means and the insulation means being structurally bonded to each other in load-bearing relationship, at the periphery of the module and at a multiplicity of zones distributed throughout the area of the module within the periphery, so as to provide a unitary load-bearing structure; and externally powered valve means operable to modulate liquid flow between the collector means and the storage means.

12. A heat transmission module as claimed in claim 11 wherein the externally operated valve means is an electrically actuated valve or a pneumatically operated valve or a hydraulically operated valve.

13. A heat transmission module as claimed in claim 11 wherein the storage means also performs a heat exchanger function.

14. A heat transmission module as claimed in claim 13 whose storage means also performs a duct function permitting effective air flow past the storage means to effect efficient heat transfer therebetween.

* * * * *

Notice of Adverse Decision in Interference

In Interference No. 101,163, involving Patent No. 4,258,701, B. S. Buckley, SOLAR COLLECTOR PANEL, final judgment adverse to the patentee was rendered May 9, 1986, as to claims 1-14.

[*Official Gazette November 25, 1986.*]